UNITED STATES PATENT OFFICE.

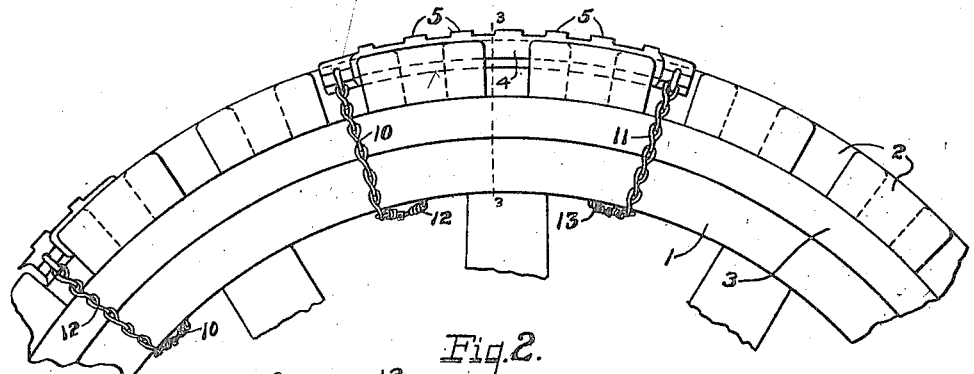
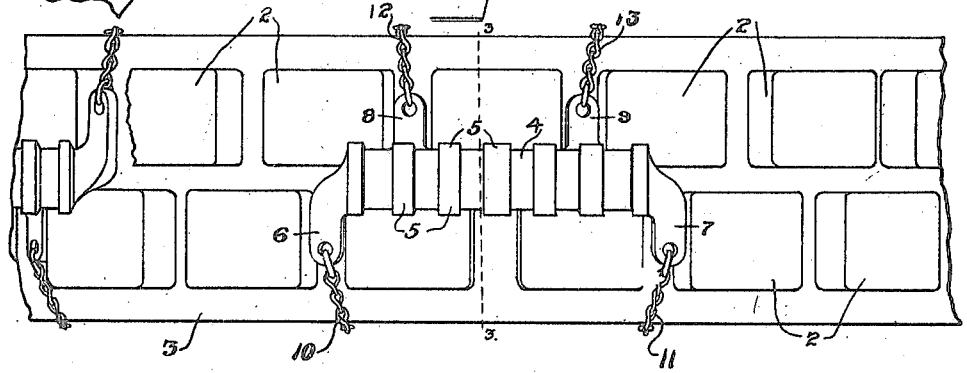
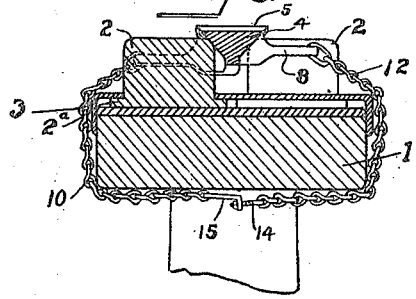

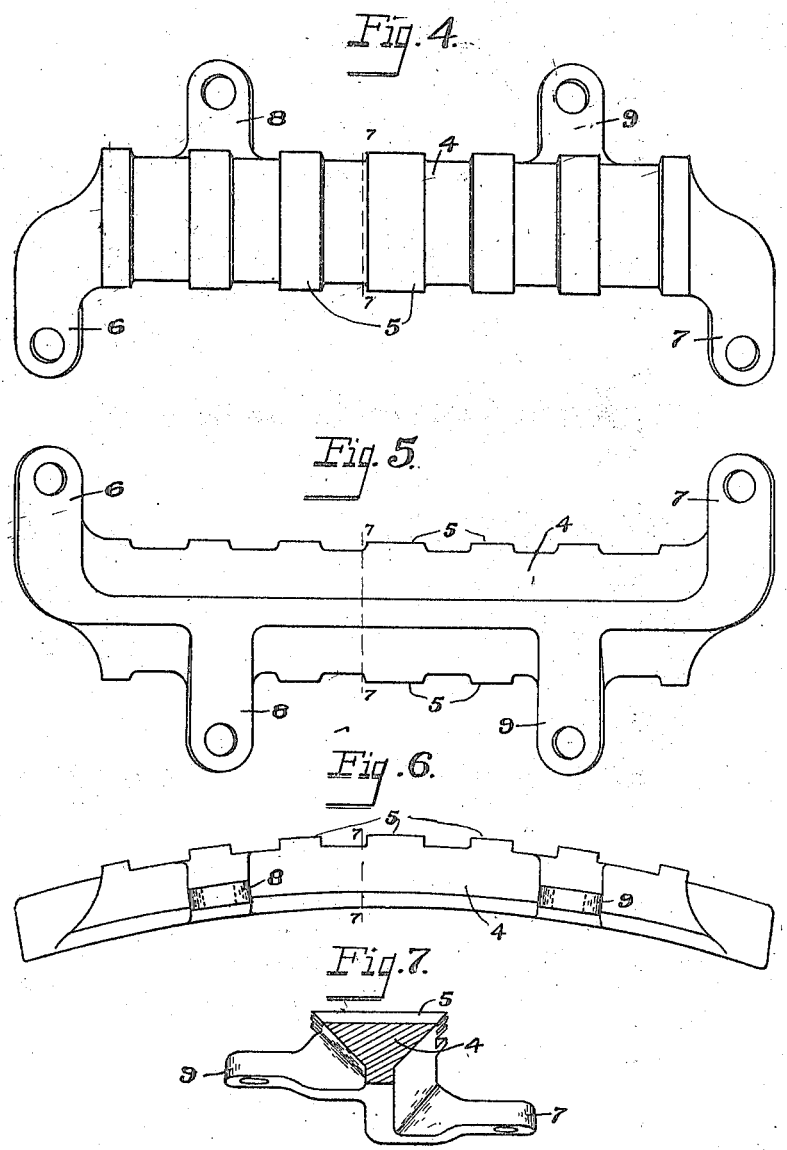

EDMUND S. ROBERTS, OF YONKERS, NEW YORK, ASSIGNOR, BY MESNE ASSIGNMENTS, TO KELLY-SPRINGFIELD TIRE COMPANY, OF JERSEY CITY, NEW JERSEY, A CORPORATION OF NEW JERSEY.

ANTISKID DEVICE.

1,164,214.  Specification of Letters Patent.  Patented Dec. 14, 1915.

Application filed February 18, 1914. Serial No. 819,370.

*To all whom it may concern:*

Be it known that I, EDMUND S. ROBERTS, a subject of the Kingdom of Great Britain, residing at Yonkers, in the county of Westchester and State of New York, have invented certain new and useful Improvements in Antiskid Devices, of which the following is a specification.

My invention relates to improvements in anti-skid devices for rubber tired wheels, especially adapted for block tires of the dual type.

The object of the invention is to provide an anti-skid device for tires of the type referred to which will be simple in construction and effective in use and also one which may be readily installed on the wheel or removed.

In the accompanying drawings, Figure 1 is a side elevation of a portion of a vehicle wheel equipped with block tires, showing my anti-skid device in position thereon. Fig. 2 is a top plan view of the same. Fig. 3 is a section on the line 3—3 of Fig. 1. Fig. 4 is a top plan view of the tread-plate of my improved device. Fig. 5 is a bottom plan view of the same. Fig. 6 is a side elevation of the same. Fig. 7 is a vertical section on the line 7—7 of Fig. 4.

Like parts are represented by similar characters of reference throughout the several views.

In the drawings, 1 represents the felly of a vehicle wheel shown equipped with a series of spaced rubber blocks 2 arranged in dual form with the blocks of the respective rows staggered with respect to each other, in the usual way; these blocks being secured on the wheel in any suitable and well-known way, such as by metal frames 3 which may be bolted to the channel and clamp the bases 2ᵃ of the rubber blocks.

The anti-skid device consists of a metallic plate 4 formed on the arc of a circle substantially equal to the circle formed by the outer treads of the rubber blocks. It is preferably formed of a length to extend over two of the rubber blocks, although it may be made longer than that if desirable and is of a V or wedge shape in form, as shown in Fig. 7. The outer periphery or tread of the plate is preferably provided with a series of transverse ribs 5 so as to present a roughened surface to the road. Extending laterally in each direction from the respective ends of the plate are lugs 6 and 7, and also extending laterally from the opposite side of said plate, intermediate the lugs 6 and 7, are two lugs 8 and 9. The lugs 6 and 7 are located such a distance apart that, when the device is installed on the tire, they will project between the spaces between adjacent blocks 2 and inclose two of said blocks, whereas the lugs or projections 8 and 9 will project between the spaces between adjacent blocks on the opposite side of the wheel and inclose but one of said blocks. Chains 10, 11, 12 and 13 are attached to perforations in the respective lugs and extend under the wheel rim where they are secured together through the medium of an eye-bolt 14 on one of the chains of each pair, screw-threaded into the bent end of a link 15 of the other chain of the pair; these chains providing a flexible connection so as to permit the tread-plate to yield more or less against the resilient rubber blocks; but at the same time hold the plate securely in position.

In installing the device, the wedge-shaped portion is laid between the two series of blocks, the construction being such that there will be a considerable space left between the bottom of the plate and the wheel channel or rim, the width of the tread portion of the plate, or that portion which comes in contact with the ground, being greater than the space between the respective rows of blocks.

In action, the plate acts as a wedge and when it, together with the blocks on which it has a bearing, pass under the wheel, the tapering sides of the V portion permit the whole to go with the rubber so that the extended portion which gives the traction always has the same relative extension beyond the periphery of the rubber. Also, owing to the wedge shape, after the plate has passed under the wheel and the rubber assumes its normal position, the tapering sides of the piece maintain it in proper place. The lugs to which the chains are attached, by reason of being located in the spaces between the ends of adjacent blocks, will prevent the device from creeping or moving peripherally about the wheel.

These devices may be placed end to end continuously about the wheel, or a less number may be used spaced equally apart, as may be found desirable.

Having thus described my invention, I claim:

1. In an anti-skid device, the combination, with a tire of the dual type formed of two series of yieldable blocks and a wheel rim within which said blocks are secured, of a curved wedge-shaped plate located between the blocks of the respective tires, the tread portion of said plate being wider than the space between said blocks and extended beyond the treads of said blocks, and flexible devices extending between the ends of said blocks and beneath the rim of said wheel for securing said plate in position.

2. In an anti-skid device, the combination, with a dual tire formed of two series of blocks and a wheel rim within which said blocks are secured, of a wedge-shaped plate located between the blocks of the respective tires, said plate having its sides formed on straight lines adapted to bear against the inner edges of the respective blocks, so that the tread of said plate will be extended beyond the treads of the respective blocks, and flexible devices extending between the respective blocks and beneath said wheel rim for securing said plate in position.

3. In an anti-skid device, the combination, with two tires each formed of a series of flexible blocks and a wheel rim in which said blocks are secured, of a curved plate located between the respective series of blocks, the outer periphery of said plate being extended beyond the treads of said blocks, integrally formed lugs on said plate projecting between the ends of adjacent blocks, and flexible devices secured to said lugs and extended under the rim of said wheel for securing said plate in position.

4. In an anti-skid device, the combination, with two tires each formed of a series of yieldable blocks and a wheel rim in which said blocks are secured, of a wedge-shaped plate located between the respective series of blocks, the sides of said plate being formed on straight lines adapted to bear upon the edges of the respective blocks so that the tread of said plate will be extended beyond the treads of said blocks, the tread of said plate being wider than the space between the respective series of blocks, integrally formed lugs on said plate projecting in opposite directions between the ends of adjacent blocks, and flexible devices connected with said lugs and extended under the rim of said wheel for securing said plate in position.

In testimony whereof, I have hereunto set my hand this eleventh day of February 1914.

EDMUND S. ROBERTS.

Witnesses:
JOSEPHINE G. ERNENWEIN,
NORMAN WALLACE.